Nov. 24, 1964
B. E. HARRIS, JR
3,158,816
PRODUCT DEMODULATOR
Filed June 28, 1962
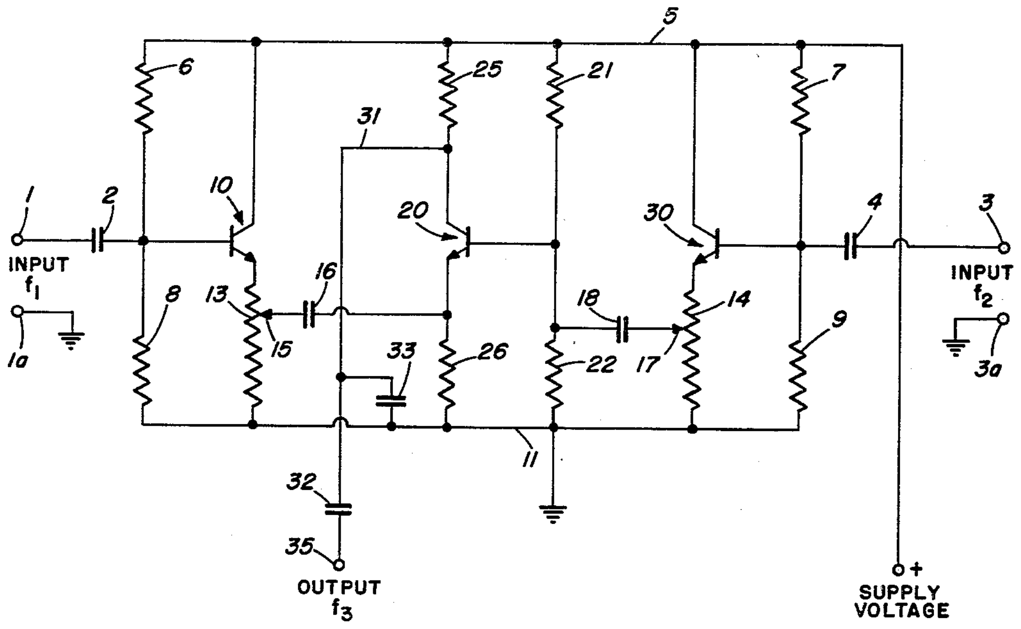
INVENTOR
BUELL E. HARRIS, JR.
BY Claude Funkhouser
Robert A. Cahill ATTORNEYS 3,158,816
Patented Nov. 24, 1964

3,158,816

PRODUCT DEMODULATOR

Buell E. Harris, Jr., 444 Pine St., Melbourne, Fla.

Filed June 28, 1962, Ser. No. 206,106
2 Claims. (Cl. 329—50)
(Granted under Title 35, U.S. Code (1952), sec. 266)

The invention described herein may be manufactured and used by or for the Government of the United States of America for governmental purposes without the payment of any royalties thereon or therefor.

This invention relates to a demodulator and more particularly to a product demodulator utilizing transistors as active elements.

A most important application for the instant invention is in the demodulation of single-sideband, suppressed carrier radio transmissions wherein the signal is received, amplified and translated in frequency to some intermediate frequency in the region from a few tens of kilocycles to several megacycles. The signal then consists of the original modulation frequencies plus or minus the intermediate frequency. The original carrier, being suppressed, is not present in any significant amplitude at this intermediate frequency.

Demodulation has been accomplished in the past by various vacuum tube circuits where the problem of isolation between signal inputs is not as significant as in the case where transistor circuits are employed. The reason for this being that the vacuum tube is a unilateral device whereas the transistor is bilateral. A linear transistor amplifier, although it will perform the demodulation function, will not alone provide satisfactory isolation between single inputs. Isolation between inputs is important because feedthrough from one input back into the other can generate additional frequencies and distortion components through combination in non-linear circuit elements of the devices providing the input signals. In the single-sideband, suppressed carrier receiver significant feedthrough of the intermediate frequency oscillator signal will prevent sampling of the single-sideband signal at the intermediate frequency input point for automatic gain control purposes.

Accordingly it is an object of the present invention to provide a transistorized product demodulator having complete isolation between input stages.

A further object of the present invention is to provide a product demodulator employing transistors as active elements which has a minimum of components and is capable of adjustment without the use of elaborate test equipment.

With these and other objects in view, as will hereinafter more fully appear, and which will be more particularly pointed out in the appended claims, reference is made to the following description taken in connection with the accompanying drawing in which:

The sole figure in the drawing shows a schematic illustration of a particular embodiment of the present invention.

According to the basic feature of the present invention, common collector amplifiers 10 and 30 and a linear, common emitter amplifier stage 20 are arranged to provide modulation or demodulation action without significant feedthrough from one input to the other.

Turning now to the sole figure of the drawings, an input signal $f_1$, which in practice would constitute an unmodulated frequency signal at the intermediate frequency, applied to input terminals 1, 1*a* is connected to the base of transistor amplifier 10 through coupling capactor 2. In corresponding fashion, an input signal $f_2$, which constitutes the received radio transmissions applied to input terminals 3, 3*a*, is connected to the base of transistor amplifier 30 through coupling capacitor 4. A biasing voltage supply on line 5 is applied directly to the collector of transistors 10 and 30 and to their respective bases through resistors 6 and 7, respectively. Resistors 8 and 9 couple the bases of transistors 10 and 30 to the grounded conductor 11. Resistors 6 and 8 establish the base bias voltage for transistor 10 while resistors 7 and 9 perform the identical function for transistor 30. In practice resistors 6 and 7 may be twice as large as resistors 8 and 9 as, for example, 30,000 ohms to 15,000 ohms. The outputs on the emitters of transistors 10 and 30 appear across resistors 13 and 14, respectively, which couple the emitters to grounded conductor 11. Resistors 13 and 14 should have values such that, under conditions established by the base biasing resistors and the available supply voltage on line 5, a current of 1 milliamp or more will flow therethrough. For a supply voltage of 12 volts, a suitable value for the output resistors may be 2,000 ohms. A variable tap 15 picks off a portion of the output signal across resistor 13 for application to the emitter of transistor amplifier 20 via coupling capacitor 16 while a variable tap 17 picks off a portion of the signal across resistor 14 which is in turn applied to the base of transistor amplifier 20 through coupling capacitor 18. The variable taps allow for adjustment of the inputs to transistor amplifier 20 within reasonable limits. A voltage divider including resistor 21, connected from the supply voltage on line 15 to the base of transistor amplifier 20, and resistor 22, connected from the base to grounded conductor 11, establish the base bias and consequently the operating point for the transistor 20. Resistor 22 should be made small enough so that the base leakage current in transistor 20 will not result in temperature instability. A value of 3,000 to 6,000 ohms has been found suitable in practice. Resistor 21 is then selected so that for the particular type of transistor 20 used, the operating point lies well within the linear portion of the transfer characteristic.

Resistor 25 couples the collector of transistor amplifier 20 to the voltage supply on line 5 while the emitter is grounded at conductor 11 through resistor 26. The value of resistor 25, assuming a voltage supply of 12 volts, should be in the vicinity of 4,000 ohms in order to insure that transistor 20 operates in the linear portion of the transfer characteristic. Resistor 26 should be sufficiently large to temperature stabilize transistor 20 and to prevent undue loading of transistor 10. A resistance value in the vicinity of 1,000 to 2,000 ohms will meet the above considerations and yet will insure linear operation of transistor 20.

The output from transistor amplifier 20 appearing across resistor 25 is connected over line 31 and capacitor 32 to the output terminal 35. Capacitor 32 should have a reactance at the modulation frequency $f_3$ which is small compared to the load impedance connected to the output terminal. Capacitor 33 connects the output line 31 to grounded conductor 11 and should have a reactance at the $f_1$ and $f_2$ frequencies which is small compared to the resistance of resistor 25. The reactance at the $f_3$ frequency should be large compared to the resistance of resistor 25.

Capacitor 2 should have a reactance at the $f_1$ frequency which is small compared to the parallel impedance of resistors 6, 8 and the input impedance of transistor amplifier 10 while capacitor 16 should have a small reactance at the $f_1$ frequency compared to the resistance of resistor 26. For a frequency $f_1$ in the vicinity of 500 kc., suitable values for capacitors 2 and 16 are 0.001 microfarad and 0.005 to 0.001 microfarad, respectively. Suitable values for capacitors 4 and 18 are determined in the manner noted above for capacitors 2 and 16.

Turning now to the operation of the disclosed invention, the $f_1$ and $f_2$ signals are amplified by the common collector amplifiers 10 and 30 whose outputs are applied to the emitter and base electrodes, respectively, of transistor amplifier 20. Transistor 20 is biased to operate in the linear portion of its transfer characteristic as noted above and consequently the amplitudes of the $f_1$ and $f_2$ signals must be adjusted so that the transistor 20 is not driven out of this linear region. Under these conditions, the output from transistor 20 contains components at the $f_1$ and $f_2$ frequencies, at the $f_1+f_2$ frequency and at the difference frequency. Since $f_2$ consists of the original modulation components plus or minus the intermediate frequency and since the $f_1$ signal is an unmodulated signal at the intermediate frequency, the difference frequency is the original modulation which has been placed on the single-sideband, suppressed carrier transmitter. All of the signal components referred to above appear across resistor 25, functioning as a load resistor for transistor 20. Because of the linear operation of all circuit elements in the demodulator, the output is an accurate reproduction of the original modulation while distortion and generation of additional frequency components are minimized. A simple low pass filter such as capacitor 33 functions to attenuate the $f_1$, $f_2$ and $f_1+f_2$ components, but because of the much lower frequency has little effect on the modulation signal, $f_3$. Obviously if lower intermediate frequencies or higher modulation frequencies are used, more elaborate low pass filter will be required.

Adjustment of the disclosed demodulator for single-sideband, suppressed carried receiver application may be carried out without elaborate test equipment. A single-sideband, suppressed carrier signal is applied to input terminal 3 and adjusted in level either by the voltage divider action of resistor 14 or by a control external to the demodulator. The proper level can be determined by measuring the output signal $f_3$ in the modulation frequency band. If there is no $f_1$ input and if transistor 20 is operating linearly and is not overloaded, then the modulation frequency output on terminal 35 should be essentially zero. The $f_2$ input level should be adjusted below the point where there is significant modulation frequency output on terminal 35 when there is no input $f_1$ on terminal 1. After the adjustment of the $f_2$ signal input level, an unmodulated signal at the appropriate frequency is applied to the input terminal 1 and the level adjusted for satisfactory $f_3$ signal output but below the point at which significant distortion occurs. For single-sideband, suppressed carrier receiver application of the demodulator, the adjustments described above, once made, do not require changing unless components are substituted. A reasonably satisfactory automatic gain control system will hold the $f_2$ signal input within satisfactory limits while the $f_1$ signal input is usually fixed in level.

Although the invention is shown employing NPN type transistors, it is obvious that PNP type transistors could be used upon reversing the supply voltage polarity. The transistors used, however, should be of the RF variety, either germanium or silicon, and have a cutoff frequency two or more times the $f_1$ and $f_2$ frequencies.

Obviously many modifications and variations of the present invention are possible in the light of the above teachings. It is therefore to be understood that within the scope of the appended claims the invention may be practiced otherwise than as specifically described.

What is claimed is:

1. A demodulator comprising:
first and second common collector transistors, and a third common emitter transistor, each having base collector and emitter electrodes;
means for applying a D.C. bias to said transistors;
means for coupling the emitter of said first transistor to the base of said third transistor;
means for coupling the emitter of said second transistor to emitter of said third transistor;
means for applying a single-sideband suppressed carrier information signal having an intermediate frequency component to the base of said first transistor; and
means for applying an unmodulated sinusoidal signal, equal in frequency to the intermediate frequency component, to the base of said second transistor.

2. The demodulator of claim 1 further including:
filter means operatively connected to the collector of said third transistor.

References Cited by the Examiner

UNITED STATES PATENTS

| | | | |
|---|---|---|---|
| 3,024,312 | 3/62 | Daguet | 325—50 |
| 3,042,872 | 7/62 | Brahm | 329—50 |
| 3,085,203 | 4/63 | Logan et al. | 325—50 |

OTHER REFERENCES

Sarbacher: Electronics and Nuclear Engineering, pub. Prentice-Hall, page 1250 (Lib. No. TK7804, S37, C.7).

Terman: "Radio Engineering," 3rd edition, pub. McGraw-Hill—1947, pages 480, 481, 542, 764. Lib. No. TK6550, T4, 1947, C.4.

ROY LAKE, *Primary Examiner.*

ALFRED L. BRODY, *Examiner.*